2,992,916
TREATMENT OF CALCIUM TUNGSTATE
Arthur E. Newkirk, Schenectady, N.Y., assignor to General Electric Company, a corporation of New York
No Drawing. Filed Sept. 10, 1958, Ser. No. 760,098
16 Claims. (Cl. 75—121)

This invention relates to the reduction of calcium tungstate ($CaWO_4$), and to a method of chemically activating the tungsten present in the reduced product. More particularly, this invention relates to a process of preparing reactive tungsten from the product obtained by reducing calcium tungstate with hydrogen which comprises converting the calcium residue to a water-soluble material and thereafter washing the tungsten until it is substantially free of the solubilized calcium residue.

Tungsten ores such as ferberite ($FeWO_4$), hubnerite ($MnWO_4$), and wolframite $[(Fe,Mn)WO_4]$ can be completely reduced with hydrogen in 2–3 hours at 800–1200° C. to produce metallic tungsten, as an alloy with the other metals, which is chemically reactive. Scheelite ($CaWO_4$), either as the natural ore or as synthetic calcium tungstate, can also be reduced with hydrogen under the same conditions as the other materials but the tungsten is not chemically reactive. This is true despite the fact that the weight loss during reduction is substantially quantitatively calculated for the formation of CaO and W, indicating that substantially all of the combined tungsten present is reduced to the metallic form. Thus, although the products in reduced ferberite, hubnerite, and wolframite can be chlorinated in good yields to the corresponding iron, tungsten and manganese chlorides, it was unexpectedly found that the products in reduced scheelite cannot be similarly clorinated. Furthermore, it has been found that tungstic acid, blue oxide, ammonium paratungstate or the tungsten metal prepared from such compounds can be carburized to tungsten carbide, for example, by employing mixtures of hydrogen and methane, but the tungsten present in hydrogen-reduced scheelite cannot be converted solely to the desired tungsten carbide (WC) under the same conditions. In this specification, the terms "scheelite" and "calcium tungstate" are used interchangeably to denote either the natural or the synthetic (e.g., metathetic) material.

Unexpectedly, I have now discovered that the tungsten present in calcium tungstate which has been reduced with hydrogen, can be rendered chemically reactive by a process which comprises treating the hydrogen-reduced product with an agent capable of converting the calcium residue to a water-soluble product. Agents capable of rendering the calcium residue soluble in water are acids, whose anion forms water-soluble calcium salts with calcium ions, and sequestering agents. The term "sequestering agent" denotes a compound which forms water-soluble chelates with metallic ions.

The product of a hydrogen-reduced scheelite which has been trated to remove the calcium residue can be carburized with a mixture of hydrogen and methane to tungsten carbide to yield as pure a product as that obtained from either tungstic acid, blue oxide, ammonium paratungstate or tungsten metal prepared from such compound. The activated tungsten product can also be halogenated to tungsten halides which are capable of conversion to pure tungsten metal.

In general, the reduction is carried out by reacting hydrogen with calcium tungstate, preferably 100–300 mesh or smaller, at an elevated temperature, usually 800–1200° C. The reduced product is treated with sufficient calcium-solubilizing agent to substantially remove all of the calcium residue. Preferably, the product is washed with water at least once after the calcium-solubilizing treatment. By the simple expedient of this treatment, tungsten in the crude mixture obtained by reducing calcium tungstate with hydrogen can be changed from a relatively unreactive form to a form which is as reactive as tungsten metal produced from other ores and compounds. The reason for this outstanding change is not completely understood. By means of the present process, derivatives of tungsten of excellent purity can be readily prepared from scheelite, the ore which is most common in the United States.

In contrast to the free metals obtained when $FeWO_4$ and $MnWO_4$ are reduced, the calcium present in scheelite is at most reduced only to calcium oxide (CaO).

An attempt to titrate the calcium oxide with acid showed that only about 75 percent of the calcium was present as a titratable, basic material. Therefore, I prefer to refer to the calcium containing product as calcium residue rather rather than as calcium oxide. Because calcium oxide is unreactive with chlorine or carbon under conditions at which Fe and Mn are both reactive with these reagents, it was believed that the tungsten in hydrogen-reduced scheelite could be easily converted to pure tungsten derivatives, whereas the tungsten in hydrogen-reduced ferberite, hubnerite and wolframite could not be converted to pure tungsten compounds. For example, Fe, W and Mn all react with chlorine to produce $FeCl_3$, $WCl_6$ and $MnCl_2$, respectively, whereas CaO does not; and Fe, W and Mn all react with methane-hydrogen mixtures to produce iron, tungsten and manganese carbides, respectively, whereas CaO does not. However, despite this chemical inactivity of CaO, it was discovered that its presence as calcium residue substantially impairs the chemical reactivity of tungsten or causes the formation of undesirable by-products. Thus, hydrogen-reduced scheelite cannot be readily chlorinated when reacted with gaseous chlorine at temperatures as high as 700° C., and when carburized with mixtures of hydrogen and methane at 1000° C., it produced a mixture of tungsten, $W_2C$, and WC instead of only the desired WC. Because of the chemical inertness of CaO to these reagents at these temperatures, it is impossible to explain the inhibiting action of the calcium residue in these reactions.

Natural scheelite is calcium tungstate ore having the properties disclosed by K. C. Li and C. Y. Wang, "Tungsten," Rheinhold Publishing Corporation, New York (1955), page 9. Synthetic scheelite is calcium tungstate usually prepared by metathesis during the purification of tungsten ores. The impurities in any specific scheelite will depend on its source.

Scheelite is reduced by heating it to a temperature of at least 800° C. in the presence of at least a stoichiometric amount of hydrogen (i.e., 3 moles of hydrogen per mole of $CaWO_4$). At 800° C., the reaction usually requires 8–15 hours. At 1000° C., the reaction is complete in 3–6 hours. The more finely subdivided the scheelite, the shorter the reaction time. Since water is a product of the reaction and water can react with tungsten at elevated temperatures to produce tungsten oxide, it is best to use hydrogen which has been substantially freed of water. In practice, it is usually more practical to pass a continuous stream of dry hydrogen over the heated scheelite until the reaction is complete as shown by no more water being formed. In this way, the gas stream sweeps the water formed in the reduction from the reaction zone and maintains the requisite low water concentration. Instead of pure hydrogen, I may use hydrogen mixed with an inert gas such as argon, neon, krypton, etc.

However, since the inert gas serves no useful function, I prefer to use pure hydrogen.

The calcium residue present in the hydrogen-reduced product can be removed by any suitable means. The simplest and cheapest method is by means of an acid or sequestering agent capable of converting the calcium residue into an aqueous soluble compound. The molarity of the acid solution, or concentration of the sequestering agent, is not critical provided there is enough reagent present (e.g., one equivalent of reagent for each equivalent of calcium) to convert substantially all of the calcium present to a soluble compound and there is enough water present to dissolve the compound produced. In practice, the reagent solution is used in excess of the required amount. It can be added in one or more portions with intermediate separation of the undissolved material, if desired, and with intermediate and final washes of the solid material with water, if desired.

Example of acids that have anions which form water-soluble salts with calcium ions are: inorganic acids, for example the hydrohalide acids whose halide ion has an atomic weight greater than 19 (e.g., HCl, HBr, HI) and certain of the oxygenated derivatives of such acids (e.g., chloric, perchloric, bromic, and iodic acids), nitric acid, hypophosphorous acid, nitrous acid, monocarboxylic acids (e.g., formic, acetic, proprionic, butyric, valeric, lactic, salicylic acids), etc. and the acids of the sequestering agents listed below which are stable in aqueous solution.

Examples of sequestering agents that may be used are the alkali metal salts (e.g., lithium, rubidium, cesium, potassium and sodium salts) of pyrophosphoric acids, polyphosphoric acids, and amino carboxylic acids (e.g., triglycine, ethylenediaminetetraacetic acid, hydroxyethylethylene diaminetriacetic acid, ethylenetriaminepentaacetic acid) and hydroxycarboxylic acids (e.g., gluconic, tartaric, citric, and saccharic acids).

The use of sequestering agents is covered in detail in R. E. Kirk, and D. F. Othmer, "Encylopedia of Chemical Technology," The Interscience Encylopedia, Inc., New York (1954), vol. 12, pp. 164–181. The methods and reagents disclosed therein are applicable to my process.

Of all these reagents, I prefer to use hydrochloric acid or the di- or tetrasodium salt of ethylenediaminetetraacetic acid. Because of cost and availability, hydrochloric acid is the most desirable material for solubilizing the calcium residue.

The activated tungsten obtained from hydrogen-reduced scheelite can undergo any reaction tungsten will undergo, for example, any of the reactions disclosed in the previously mentioned text—"Tungsten" by Li and Wang.

Tungsten prepared according to this invention can be utilized to form the various tungsten halides, e.g., tungsten dibromide, tungsten pentabromide, tungsten diiodide, tungsten hexafluoride, tungsten dichloride, tungsten tetrachloride, tungsten pentachloride, etc. Commercially, the most important tungsten halide is tungsten hexachloride, which can be prepared according to the equation $W + 3Cl_2 \rightarrow WCl_6$ at 600 to 700° C., at atmospheric pressure. The resulting chloride can be easily purified by distillation and decomposed under reduced pressure, for example, at 1500–2500° C. at a pressure of $10^{-3}$ atmospheres, to produce dense, ductile tungsten useful in making filaments for electric lamps. In the presence of a reducing agent such as an alloy of 50% Al, 45% Cu, 5% Zn, these chlorides can be reacted with carbon monoxide to form tungsten carbonyl which is useful for depositing metallic tungsten by decomposing the tungsten carbonyl on the heated surface to be coated.

The tungsten can also be carburized to tungsten carbide in any manner by which tungsten itself can be carburized, for example, those disclosed in P. Schwarzkopf, and R. Kieffer, "Refractory Hard Metals," MacMillan Co., New York (1953), pp. 138–168, as well as that disclosed in the article by A. E. Newkirk, and I. Aliferis, Journal of the American Chemical Society, 79 4629 (1957). Gaseous hydrocarbon atmospheres such as disclosed in Trans. Am. Soc. Metals 26, 463–82 (1938) can be used in place of a methane-hydrogen atmosphere.

As will be readily apparent to those skilled in the art, the process equipment should be constructed of a material which is non-reactive with the reagents at the temperature where they are used. Nickel is a very satisfactory metal to use for the hydrogenation and carburization reactions. Quartz is used for the chlorination and can also be used for the other steps but is more difficult to fabricate and more expensive. It also reacts with the calcium oxide formed in the hydrogenation step.

The following examples are illustrative of the practice of my invention and are not intended for purposes of limitation. In the examples, all parts are by weight unless stated otherwise.

*Example 1*

The following example illustrates the reduction of $CaWO_4$ with hydrogen.

A stream of hydrogen was passed for three hours over a bed of finely divided calcium tungstate heated to a temperature of 1000° C. A quartz reaction tube and boat were used. The calcium tungstate was 98.7% pure $CaWO_4$ as indicated by a tungsten analysis of 63%. The reaction with hydrogen produced a weight loss of 16.69% based on the calcium tungstate content. This compares to a theoretical value of 16.67% for the postulated reaction forming tungsten metal, calcium oxide and water. An X-ray diffraction pattern showed the presence of both calcium oxide and tungsten. After washing the residue with dilute hydrochloric acid followed by a water wash and drying, the product gave an X-ray diffraction pattern showing only the presence of tungsten.

*Example 2*

Example 1 was repeated using a calcium tungstate which was 89.7% pure $CaWO_4$ as shown by a tungsten analysis of 57.3%. After the hydrogen reaction, the product showed a weight loss of 16.38%. When this product was thoroughly washed with aqueous hydrochloric acid followed by a water wash and drying, it also gave an X-ray diffraction pattern showing only tungsten present.

*Example 3*

The product of Example 2 was placed in the reaction tube and heated to a temperature of 1000° C. A stream of hydrogen containing a 0.86% methane was passed over the heated bed. The product had a carbon content of 6.12% (theory for WC, 6.13%) and gave an X-ray diffraction pattern showing only the presence of tungsten carbide, WC. When the hydrogen fired calcium tungstate was not treated with acid, the carburization reaction gave a product analyzing only 1.96% carbon. The X-ray diffraction pattern showed the presence of W, $W_2C$ and WC.

*Example 4*

A sample of calcium tungstate weighing 1.5 grams and analyzing 98.2% pure $CaWO_4$ as shown by a tungsten analysis of 62.7% was placed in a nickel boat and inserted in a quartz tube where it was reacted with a stream of hydrogen at a temperature of 1000° C. for 6 hours. At the end of this time, the sample showed a weight loss of 15.49% based on the total weight of the sample. The product was placed in a dry box to exclude atmospheric moisture and divided into two parts, one part weighing 0.6229 gram was slurried in 30 milliliters of 0.1 normal hydrochloric acid for a period of 30 minutes. The solution was filtered and the residue washed and dried, yielding an acid insoluble residue weighing 0.4898 gram, which corresponds to 78.63% of the weight of the sample before treatment with acid. If the product had been a 1/1 molar mixture of calcium oxide and tungsten, the weight of the residue should have been 76.63% of the initial example before treatment of acid. This acid-washed product, the residue which had not been treated with acid, and a sample of commercially pure tungsten powder were each separately chlorinated by placing the samples in quartz boats in a quartz tube and heating at a temperature in the range of 600° to 700° C., while a stream of chlorine was passed over the samples for 2 hours. The gaseous tungsten chloride product was cooled to room temperature, where the tungsten hexachloride condenses but the chlorine gas does not. The pure tungsten powder sample weighing 0.5003 gram gave 0.9 gram of product compared to a theoretical yield of 1.08 grams if it were all converted to tungsten hexachloride. There was no residue visible in the reaction boat. The tungsten from the acid-washed hydrogen-reduced scheelite weighing 0.4736 gram gave 0.8 gram of product compared to the theoretical yield of 1.02 grams if all were converted to tungsten hexachloride. The residue remaining in the boat weighed 0.0050 gram. The sample of scheelite which had been reduced with hydrogen but not washed with acid weighed 0.5901 gram. It yielded 0.5 gram of product compared to a theoretical yield of 1.00 assuming that it was 78.63% tungsten, which is the same basis as the acid-washed product. The residue remaining in the reaction boat weighed 0.4241 gram.

Example 5

A one-gram sample of calcium tungstate analyzing 98.7% pure $CaWO_4$ was placed in a nickel boat and inserted in a quartz tube where it was reacted with a stream of hydrogen at a temperature of 1000° C., until there was a weight loss of 16.36% based on the total weight of the sample. After cooling, the product was slurried with 30 milliliters of a one molar aqueous acetic acid solution for 2 hours. The suspension was filtered. The residue was washed with water and dried overnight at a temperature of 105° C. in air. A 0.5 gram sample of the residue was chlorinated by the method described in Example 4. All but 0.0020 gram of the residue was converted to gaseous tungsten hexachloride.

Example 6

A one gram sample of the calcium tungstate of Example 5 was reacted with hydrogen at 1000° C. until there was a weight loss of 16.28%. The product was treated with 5 milliliters of a saturated, aqueous solution of the tetrasodium salt of ethylenediaminetetraacetic acid diluted with 25 milliliters of water. The residue from this treatment was chlorinated by the method disclosed in Example 4 using a 0.50 gram sample. All but 0.0151 gram was converted to gaseous tungsten hexachloride.

The above examples have illustrated the modifications and variations of the present invention. But obviously, other modifications and variations of the present invention are possible in light of the above teaching. It is therefore to be understood that changes may be made in the particular embodiments of the invention described which are within the full intended scope of the invention as defined by the appended claims.

What I claim as new and desire to secure by Letters Patent of the United States is:

1. The process of preparing reactive tungsten which consists of reducing calcium tungstate with hydrogen, converting the calcium residue in the hydrogen-reduced product to a water-soluble calcium compound by reaction with a calcium water-solubilizing agent and thereafter washing the tungsten until it is substantially free of the solubilized calcium residue.

2. The process of claim 1 wherein the calcium residue is solubilized with an acid having an anion which forms a water soluble salt with calcium ion.

3. The process as in claim 2 wherein the acid is an inorganic acid.

4. The process as in claim 2 wherein the acid is hydrochloric acid.

5. The process as in claim 2 wherein the calcium residue is solubilized with an organic carboxylic acid.

6. The process as in claim 5 wherein the organic carboxylic acid is acetic acid.

7. The process as in claim 1 wherein the calcium residue is solubilized with a sequestering agent.

8. The process as in claim 7 wherein the sequestering agent contains both amine groups and carboxylic acid groups.

9. The process as in claim 7 wherein the sequestering agent is a sodium salt of ethylenediaminetetraacetic acid.

10. The process of claim 7 wherein the sodium salt is the tetrasodium salt of ethylenediaminetetraacetic acid.

11. The process of claim 1 wherein the calcium water-solubilizing agent is selected from the class consisting of acids whose anion forms water-soluble calcium salts with calcium ions and sequestering agents.

12. The process of preparing a tungsten halide which consists of reacting calcium tungstate with hydrogen, reacting the hydrogen-reduced calcium tungstate with a calcium water-solubilizing agent to convert essentially all of the calcium residue to a water-soluble calcium compound, washing the tungsten until it is substantially free of the solubilized calcium residue and thereafter reacting the tungsten with a halogen to form the corresponding tungsten halide.

13. The process as in claim 12 wherein the halogen is chlorine and the tungsten halide is tungsten hexachloride.

14. The process of preparing tungsten carbide which consists of reacting calcium tungstate with hydrogen, reacting the hydrogen-reduced calcium tungstate with a calcium water-solubilizing agent to convert essentially all of the calcium residue to a water-soluble calcium compound, washing the tungsten until it is substantially free of the solubilized calcium residue, and thereafter reacting the tungsten with a carburizing agent to form tungsten carbide.

15. The process as in claim 14 wherein the carburizing agent comprises a gaseous hydrocarbon.

16. The process as in claim 14 wherein the carburizing agent comprises methane.

References Cited in the file of this patent

UNITED STATES PATENTS

| | | |
|---|---|---|
| 1,217,913 | Butterfield | Mar. 6, 1917 |
| 2,829,926 | Supiro | Apr. 8, 1958 |

OTHER REFERENCES

Encyclopedia of Chemical Technology, vol. 12, by R. E. Kirk and D. F. Othmer, pp. 164–66.

Tungsten: by K. C. Li and C. Y. Wang, 2nd ed., pp. 212, 246.